United States Patent [19]

Nakabayashi et al.

[11] 4,309,525
[45] Jan. 5, 1982

[54] PRODUCTION OF SPHERE-FORMED POWDERY COPOLYMERS

[75] Inventors: Masamitsu Nakabayashi, Sennan; Fumihiro Doura, Sakai; Yuzo Furukawa, Kawanishi, all of Japan

[73] Assignee: Takeda Chemical Industries, Ltd., Osaka, Japan

[21] Appl. No.: 149,956

[22] Filed: May 15, 1980

[30] Foreign Application Priority Data

May 21, 1979 [JP] Japan .................................. 54/62433
Apr. 15, 1980 [JP] Japan .................................. 55/49957

[51] Int. Cl.$^3$ .............................................. C08F 6/22
[52] U.S. Cl. ..................................... 528/487; 525/59; 525/60; 525/61; 525/62; 528/494;
[58] Field of Search .................. 528/494, 487; 525/61, 525/62, 59

[56] References Cited

U.S. PATENT DOCUMENTS 3,622,555 11/1971 Rothenbury et al. ............... 528/494
3,972,865 8/1976 McClain et al. ....................... 526/14
4,027,079 5/1977 McClain et al. ....................... 526/10
4,212,966 7/1980 McClain .............................. 528/486

FOREIGN PATENT DOCUMENTS 1023094 12/1977 Canada .
88404 3/1972 German Democratic Rep. .
51-17872 6/1976 Japan .

Primary Examiner—Stanford M. Levin
Attorney, Agent, or Firm—Wenderoth, Lind & Ponack

[57] ABSTRACT

A spherical powder of a hydrolyzed ethylene-vinyl acetate copolymer or its carboxyl modified product, is prepared by a method which comprises mixing 100 parts by weight of (1) a hydrolyzed product of an ethylene-vinyl acetate copolymer having 5 to 50% by weight of vinyl acetate group content or (2) a carboxyl modified product of the aforementioned hydrolyzed product obtained by reacting said hydrolyzed product with an unsaturated carboxylic acid or cyclic acid anhydride, with 10 to 100 parts by weight of an organic solvent capable of dissolving said hydrolyzed product or its carboxyl modified product, the solvent being not freely miscible with water and having a boiling point of not lower than 80° C., 300 to 1000 parts by weight of water and 0.1 to 10 parts by weight of an alkylphenol ethylene oxide adduct having an HLB value of 10 to 20, emulsifying said mixture while it is maintained at a temperature of not lower than the softening point of said hydrolyzed product or carboxyl modified product, and decreasing the temperature of the system under stirring down to not higher than said softening point. The resultant powder is virtually spherical in its particle form, the particles are of almost equal size, and their particle size distribution is such that not less than 70% fall between 70 and 300μ. Such spherical powder, when used in electrostatic coating, can provide beautiful coating films.

10 Claims, No Drawings

PRODUCTION OF SPHERE-FORMED POWDERY COPOLYMERS

The present invention relates to a method for producing spherical powder of hydrolyzed products of ethylene-vinyl acetate copolymer (hereinafter the hydrolyzed products are sometimes referred to as "HEVA") or of their carboxyl modified products.

There have been so far proposed a variety of processes for producing powder of HEVA; for example, known are a method for obtaining finely powdered HEVA which comprises hydrolyzing ethylene-vinyl acetate copolymer (hereinafter sometimes referred to as "EVA") with the use of an alkali catalyst and conducting a steam distillation of said hydrolyzed product in the presence of a water-soluble block copolymer from ethylene oxide and propylene oxide (Japanese Published Unexamined Patent Application No. 64694/1974), a method for producing finely powdered particles of HEVA which comprises hydrolyzing EVA with a saturated hydrocarbon-methanol-alkali hydroxide system and treating the resultant product with an aqueous solution of a long chain alcohol ethylene oxide adduct (Japanese Published Examined Patent Application No. 17872/1977), and a method for simultaneously hydrolyzing and finely pulverizing EVA in a solventless system under pressure in the presence of a water-soluble block copolymer from ethylene oxide and propylene oxide (Japanese Published Unexamined Patent Application Nos. 122189/1976 and 122190/1976). In these methods, however, it is difficult to control the grain size distribution of HEVA particles, and complex procedures are required to remove residual catalysts and side-reaction products from resultant-hydrolyzed products.

The present inventors, after considerable investigation carried out in view of the above-mentioned problems, found a method for obtaining spherical powder having uniform particle size by the use of a specified alkylphenolethylene oxide adduct.

Thus, the present invention relates to a process for producing spherical powder of the hydrolyzed product or of its carboxyl modified product, as hereinafter described, characterized in that said process comprises mixing 100 parts by weight of (1) a hydrolyzed product of an ethylene-vinyl acetate copolymer having 5 to 50% by weight of vinyl acetate group content or (2) a carboxyl modified product of said hydrolyzed product obtained by reacting said hydrolyzed product with an unsaturated carboxylic acid or cyclic acid anhydride, with 10 to 100 parts by weight of an organic solvent capable of dissolving said hydrolyzed product or its carboxyl modified product, the solvent being not freely miscible with water and having a boiling point of not lower than 80° C., 300 to 1000 parts by weight of water and 0.1 to 10 parts by weight of an alkylphenol ethylene oxide adduct having an HLB value of 10 to 20, emulsifying said mixture while it is maintained at a temperature of not lower than the softening point of said hydrolyzed product of carboxyl modified product, and lowering the temperature of the system under stirring down to not higher than said softening point.

The above-mentioned ethylene-vinyl acetate copolymers (EVA) can be obtained by conventional processes, and the vinyl acetate content in EVA is not more than 70% by weight and preferably 5 to 50% by weight. The melt index of EVA is not specifically limited and is desirably 0.1 to 500 g/10 min.

EVA may contain a third comonomer polymerizable with ethylene and vinyl acetate in the range of not more than about 20%, and as specific examples of such comonomer may be mentioned methyl acrylate, butyl acrylate, methyl methacrylate, butyl methacrylate, butyl itaconate, diethyl fumarate, etc.

The above-mentioned hydrolyzed product (HEVA) of ethylenevinyl acetate copolymer can be obtained by hydrolyzing EVA, and the reaction may be conducted under the same conditions as in the conventionally known, ordinary hydrolysis reactions; it can be conducted, for example, in the system comprising a low-boiling alcohol (e.g., methanol, ethanol, propanol, etc.) and an alkali (e.g., sodium hydroxide, potassium hydroxide, sodium methylate, etc.). Furthermore, the reaction may be conducted in the presence of a hydrocarbon solvent (e.g., benzene, toluene, xylene, etc.). In this case, the degree of hydrolysis (degree of saponification) is not specifically limited and is, in general, 5 to 95%.

The carboxyl modified product of HEVA is obtained by reacting HEVA with an unsaturated carboxylic acid or cyclic acid anhydride. This reaction, for example, can be conducted in a homogeneous-solution, homogeneous-melting or heterogeneous system. The carboxyl group content is not specifically limited and, generally, an unsaturated carboxylic acid or cyclic acid anhydride is preferably reacted in the proportion of 0.1 to 15% by weight against HEVA.

In the reaction, unsaturated carboxylic acids are represented by the general formula of $CHR'=CRCOOH$ wherein R and R' are hydrogen, alkyl, carboxyl or carboxylic acid ester, respectively. Among specific examples of these are acrylic acid, methacrylic acid, crotonic acid, itaconic acid, maleic acid, etc., and these monomers can be used solely or in combination with other ethylenically unsaturated monomers such as styrene and acrylates.

The above-mentioned cyclic acid anhydrides are represented by the general formula of

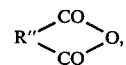

wherein R" designates, for example, a divalent aromatic or aliphatic residue. As specific examples of said acid anhydride may be mentioned maleic anhydride, succinic anhydride, trimellitic anhydride, glutaric anhydride, phthalic anhydride, itaconic anhydride and hymic anhydride.

The reaction between HEVA and an unsaturated carboxylic acid is conducted by heating them together with a radical initiator. Examples of such radical initiator include organic peroxides such as benzoyl peroxide and t-butyl hydroperoxide, azobisisobutyronitrile, etc. The amount of the radical initiator may be the so-called catalytic amount, specifically in the proportion of 0.01 to 1.0% by weight against HEVA. The heating temperature as described above, only if it is not lower than the decomposition initiation temperature of the radical initiator, is not specifically restricted and is generally in the range of 50° to 150° C. The amount of said unsaturated carboxylic acid to be reacted with HEVA, also, is not specifically restricted and, generally, is desirably in the range of 0.1 to 15% by weight against HEVA. A reaction time within the range of 0.1 to 5 hours is sufficient.

The reaction of HEVA with a cyclic acid anhydride is conducted by adding a cyclic acid anhydride to an alkali-hydrolyzed reaction solution of HEVA and heating at about 50° to 150° C. for about 0.1 to 5 hours. The amount of said cyclic acid anhydride is such as may be required for reacting (esterifying) at most about 50 mole %, preferably about 2 to 20 mole %, of the vinyl alcohol units contained in HEVA.

HEVA or the carboxyl modified product of HEVA obtained in the above-mentioned manner can be employed as the starting material of the present invention, with or without separation and purification by the conventional procedures.

The organic solvent which is useful in the present invention may be any type of solvent that dissolves HEVA or carboxyl modified products of HEVA, is not freely miscible with water, and has a boiling point of not lower than 80° C. The organic solvent being not freely miscible with water means a solvent which forms two layers with water. Specific examples of such organic solvents include aromatic hydrocarbons having 6 to 14 carbon atoms, such as benzene, toluene, xylene, ethylbenzene and diethylbenzene, and the like. These organic solvents may be employed in the amount of 0.1 to 1 time, preferably 0.2 to 0.8 time that of HEVA or carboxyl modified product of HEVA.

The alkylphenol ethylene oxide adduct which is useful in the present invention has an HLB value of 10 to 20, preferably 13 to 19, and specific examples include polyoxyethylene-nonyl-phenol ether and polyoxyethylene-octyl-phenol ether which both have an HLB value of 15 to 19. The amount of the alkylphenol ethylene oxide adduct is 0.1 to 10 parts by weight, preferably 0.2 to 2.0 parts by weight, against 100 parts by weight of HEVA or carboxyl modified product of HEVA. Alkylphenol ethylene oxide adducts having an HLB value of less than 10 possess weakened emulsifying power and therefore yield large lump-formed materials but not spherical powder. Further, alkylbenzene sulfonic acids such as dodecylbenzene sulfonic acid may be employed in conjunction with the alkylphenol ethylene oxide adduct to be employed in the present invention. When an alkali-hydrolyzed EVA which has come to be contaminated normally by the impurity of sodium acetate is directly used as the starting material of HEVA, for example, it may be possible to reduce the content of sodium acetate to a very low level by the combined use of the above-mentioned alkylphenol ethylene oxide adduct and dodecylbenzene sulfonic acid.

In the present invention, the HEVA or carboxyl modified product of HEVA, organic solvent, alkylphenol ethylene oxide adduct and water are mixed at the specified ratio and stirred under heating to be emulsified. The added amount of water is 300 to 1000 parts by weight, preferably 400 to 800 parts by weight, against 100 parts by weight of HEVA or carboxyl modified product of HEVA. Too small amount of water results in extremely increased adhesiveness of dispersed particles and brings about difficulties in the separation and washing procedures after emulsification is completed, whereas too large amount of water produces adequate dispersion effect but is economically unfavored. The heating temperature may be not lower than the softening point of HEVA or carboxyl modified product of HEVA and, generally, is preferably in the range of not lower than the above-mentioned softening point but not higher than 95° C. The stirring rate influences the size of the desired spherical powder and, generally, a higher stirring rate tends to reduce the particle size of the resultant powder. The stirring apparatus may be of any time, and among the preferred apparata is the Henschel Mixer, because it is speed-controllable and produces a strong stirring effect, enough to permit adjustment of the particle size in accordance with the intended purpose. By lowering the temperature down to not higher than the softening point of HEVA or its carboxyl-modified product after emulsification is completed, HEVA or carboxyl modified product of HEVA can be obtained in the form of a spherical powder. The spherical powder can be separated by the conventional procedures such as filtration.

The powder obtained in accordance with the present invention is virtually spherical in its particle form, the particles are of almost equal size, and their particle size distribution is such that not less than 70% fall between 70 and 300$\mu$. Such spherical formed powder, when it is used in electrostatic coating, can provide beautiful coating films.

So as to illustrate more specifically the present invention, examples and reference examples are set forth below, wherein the parts and %, unless otherwise specified, indicate parts by weight and % by weight.

EXAMPLE 1

A 5-l flask is equipped with a stirrer, condenser, thermometer and nitrogen inlet pipe.

Before the reaction is initiated, the system is flushed with $N_2$ gas to replace the inside of the flask completely with $N_2$ gas.

Placed in the flask are 1978 parts of xylene of the technical grade and 1150 parts of ethylene-vinyl acetate copolymer [with a vinyl acetate content of 28% by weight, MI (melt index) of 400 g/10 min. Tradename "Evaflex 210" of Mitsui Polychemicals Co., Ltd.] to be warmed at 60° to 70° C. for uniform solution.

The temperature of the contents in the flask is lowered down to 60° C., and 479 parts of methanol of the technical grade is added, followed by further maintaining the temperature of the contents at 45° to 50° C. 67.4 parts of a 24% sodium methoxide-methanol solution is added, and the reaction is allowed to proceed under stirring at 45° to 50° C. for 60 min. 16.2 parts of water is added, and stirring is continued for 1 hour to stop the reaction.

The condenser is removed and the temperature of the contents in the flask is raised up to 120° C. while flushing with $N_2$ gas to distil off 2339 parts of the solvent. The amount of the remaining solvent is 30% by weight, on a dry weight basis, against the theoretical yield of the hydrolyzed product, and all of the solvent is ascertained, by gas chromatography, to be xylene.

The resultant viscous product is transferred, under pressure of $N_2$ gas, into a 20-l Henschel mixer equipped with a condenser, $N_2$ inlet pipe and thermometer. Following addition of 5040 parts of warm water containing 5.75 parts of polyoxyethylenenonylphenyl ether (tradename, "Emulgen 950" of Kao Soap Co., Ltd.) and 5.75 parts of dodecylbenzene sulfonic acid (tradename, "SBS-12-100" of Teikoku Kako Co., Ltd.) dissolved therein and being warmed at 80° C., heating is effected with stirring at 510 rpm, and stirring is further continued for 30 minutes while the temperature of the contents is maintained at 90° C. After cooling down to 50° C. with stirring, the dispersed substance is separated and, there results, upon drying, a finely powdered, spherical hydrolyzed product of ethylene-vinyl acetate copolymer having the typical properties as shown in Table 1.

TABLE 1

| Property | Example 1 |
| --- | --- |
| hydrolysis degree, % | 91.0 |
| MI, g/10 min. | 180 |
| Sodium acetate content, % | 0.07 |
| Volatile content, % | 0.20 |
| Particle size distribution, %; | |
| Not more than 74μ | 1 |
| 74μ to 149μ | 34 |
| 149μ to 295μ | 61 |
| Not smaller than 295μ | 4 |
| Microscopic observations | Complete sphere (dense structure) |

EXAMPLES 2 THROUGH 4

In the same manner as in Example 1, the treatment is effected with the use of polyoxethylenenonylphenol ethers with various HLB values shown in Table 2, and there result hydrolyzed products having the typical properties as indicated in Table 2.

REFERENCE EXAMPLE 1

Also given in Table 2 are results obtained when a long-chain alcohol ethylene oxide adduct with HLB of 13.5 (tradename, "Adekatol SO-135" of Asahi Electro-Chemical Co., Ltd.) is used as a surfactant in Example 1.

REFERENCE EXAMPLE 2

Shown in Table 2 are results obtained when an oxyethylene-oxypropylene block copolymer (tradename, "Pluronic F 98" of Wyandotte Chemicals Corp.) is employed as a surfactant in Example 1.

REFERENCE EXAMPLE 3

Given in Table 2 are results obtained when sodium dodecylbenzene sulfonate (anionic surfactant) is employed as a surfactant in Example 1.

parts of technical grade xylene and 1260 parts of ethylene-vinyl acetate copolymer (with a vinyl acetate content of 28% by weight and MI of 150 g/10 min. Tradename, "Evaflex 220" of Mitsui Polychemicals Co., Ltd.), which are then warmed under stirring at 60° to 70° C. for uniform solution.

The temperature of the contents of the mixer is decreased down to 60° C., and 131 parts of technical grade methanol is added, followed by maintaining the temperature of the contents at 45° to 50° C.

37 parts of a 24% sodium methoxide-methanol solution is added, and the reaction is allowed to proceed under stirring at 45° to 50° C. for 60 minutes. 8.8 parts of water is added, and stirring is continued for 60 minutes to stop the reaction.

Then, the condenser is removed, and the temperature of the contents is gradually increased, under an $N_2$ gas stream, up to 120° C. while the low-boiling solvents are distilled off. After the temperature of the contents is maintained at 120° C., 13.9 parts of acrylic acid and 0.5 part of benzoyl peroxide are added to allow the reaction to proceed for 30 minutes. Thereafter, the solvent is ditilled off, while flusing with $N_2$ gas, until the remaining solvent reaches the amount as described in each of the Examples in Table 3.

Then, following the addition of 7000 parts of warm water containing 3.45 parts of polyoxyethylene-nonylphenol ether having an HLB of 18.2 (tradename, "Emulgen 950" of Kao Soap Co., Ltd.) and 3.45 parts of dodecylbenzene sulfonic acid (tradename, "SBS-12-100" of Teikoku Kako Co., Ltd.) dissolved therein and being warmed at 80° C., heating is effected with stirring at 510 rpm to increase the temperature of the contents up to 90° C., and stirring is continued for a further 30 minutes to achieve adequate emulsification and dispersion. The contents are cooled down to 50° C. under stirring while water is introduced in the jacket, and separation and drying of the resultant dispersion yield the hydrolyzed and grafted ethylene-vinyl acetate copolymer having the typical properties as shown in Table 3.

TABLE 2

| Property | Example 2 | Example 3 | Example 4 | Reference example 1 | Reference example 2 | Reference example 3 |
| --- | --- | --- | --- | --- | --- | --- |
| HLB of surfactants | 12.2 | 15.1 | 18.9 | 13.5 | — | — |
| Tradename | Emarugen 910 | Emarugen 930 | Emarugen 985 | Adeka Tol SO-135 | Pluronic F 98 | DBN -60 |
| Hydrolysis degree, % | 90.6 | 91.2 | 90.7 | 89.7 | 91.0 | 90.2 |
| MI, g/10 min. | 181 | 177 | 175 | 179 | 182 | 185 |
| Content of sodium acetate, % | 0.07 | 0.06 | 0.09 | 0.55 | 0.36 | 0.42 |
| Volatile content, % | 0.21 | 0.15 | 0.16 | 0.25 | 0.35 | 0.30 |
| Particle size distribution, %; | | | | * | * | ** |
| Not more than 74μ | 1 | 7 | 10 | | | |
| 74μ to 149μ | 46 | 56 | 52 | | | |
| 149 to 295μ | 51 | 35 | 35 | | | |
| Not less than 295 | 2 | 2 | 3 | | | |

Remarks:
*Blocking occurs during cooling, not resulting in powder-formed particles.
**Vigorous foaming yields no powder-formed particles.

EXAMPLES 5 THROUGH 11

In a 20-l Henschel mixer equipped with a condenser, thermometer and nitrogen inlet pipe are placed 2709

TABLE 3

| | Example No. | | | | | | |
| --- | --- | --- | --- | --- | --- | --- | --- |
| | 5 | 6 | 7 | 8 | 9 | 10 | 11 |
| Amount of distilled off solvent, parts | 2860 | 2627 | 2394 | 2044 | 1810 | 1227 | 0 |

TABLE 3-continued

|  | Example No. | | | | | | |
|---|---|---|---|---|---|---|---|
|  | 5 | 6 | 7 | 8 | 9 | 10 | 11 |
| Amount of remaining solvent, % | 10 | 30 | 50 | 80 | 100 | 150 | 2552 |
| Properties of dried Products: | | | | | | | |
| Degree of hydrolysis % | 70.2 | 70.1 | 70.1 | 70.2 | 70.0. | 70.2 | 70.7 |
| MI | 69.1 | 69.5 | 70.2 | 70.7 | 71.0 | 69.3 | 70.7 |
| Amount of acrylic acid grafted, % | 0.20 | 0.25 | 0.18 | 0.19 | 0.22 | 0.23 | 0.26 |
| Content of sodium acetate, % | 0.19 | 0.07 | 0.08 | 0.05 | 0.05 | 0.10 | 0.11 |
| Volatile content | 0.25 | 0.16 | 0.18 | 0.21 | 0.22 | 0.18 | 0.23 |
| Average particle size, $\overline{D}$, $\mu$ |  | 145 | 135 | 100 | 83 | 44 | Below 10 |
| Particle size distribution, %; | * |  |  |  |  |  | ** |
| Not more than 74$\mu$ |  | 3 | 3 | 1 | 0.4 | — |  |
| 74$\mu$ to 149$\mu$ |  | 43 | 36 | 20 | 10.6 | 2 |  |
| 149$\mu$ to 295$\mu$ |  | 50 | 53 | 51 | 51 | 20 |  |
| Not less than 295$\mu$ |  | 4 | 8 | 28 | 38 | 78 |  |
| Microscopic observations | — | sphere (dense) | sphere (dense) | sphere (dense) | sphere (dense) | sphere (dense) | sphere |

Remarks:
*Blocking takes place during cooling.
**There results fine powder, not permitting measurement.

EXAMPLE 12

In the same manner as in Example 1, ethylene-vinyl acetate copolymer (with a vinyl acetate content of 33% by weight, MI of 25 g/10 min. Tradename "Evaflex 150" of Mitsui Polychemicals Co., Ltd.) is hydrolyzed to give a hydrolyzed product. In a 20-l Henschel mixer equipped with a condenser, $N_2$ inlet pipe and thermometer are placed 1000 parts of the above obtained hydrolyzed product and 3,440 parts of technical grade xylene, and the mixture is warmed at 60° C. to dissolve the hydrolyzed product. To the solution are added 100 parts of phthalic anhydride and 10 g of triethylamine, and the reaction is allowed to proceed under stirring at 120° C. for 2 hours. Then, the condenser is removed and the temperature of the contents in the flask is raised up to 120° C. while flushing with $N_2$ gas to distil off 2840 parts of solvent. The amount of the remaining solvent is 60% by weight, on a dry weight basis, against the hydrolyzed product. In the resultant mixture is dissolved 4 parts of polyoxyethylene-nonyl-phenol ether having an HLB value of 18.2 (tradename "Emulgen 950" of Kao Soap Co., Ltd.), and 6,000 parts of hot water heated at 80° C. is added. The temperature of the mixture is adjusted at 92° C. under stirring at 510 rpm, and the stirring is further continued for 30 minutes. After cooling down to 50° C. with stirring, the dispersed substance is separated and, there results, upon drying, a spherical powder of the hydrolyzed and esterified ethylene-vinyl acetate copolymer having the typical properties as shown in Table 4.

TABLE 4

| Amount of phthalic anhydride, % | 15 |
|---|---|
| Content of sodium acetate, % | 0.05 |
| Volatile content | 0.25 |
| Particle size distribution, % | |
| Not more than 74$\mu$ | 2 |
| 74$\mu$ to 149$\mu$ | 41 |
| 149$\mu$ to 295$\mu$ | 52 |
| Not less than 259$\mu$ | 5 |
| Microscopic observation | Complete sphere |

TABLE 4-continued

| | (dense) |
|---|---|

What is claimed is:

1. A method for producing spherical powder of a hydrolyzed ethylene-vinyl acetate copolymer or its carboxyl modified product, which comprises
   mixing (A) 100 parts by weight of (1) a hydrolyzed product of an ethylene-vinyl acetate copolymer having 5 to 50% by weight of vinyl acetate group content or (2) a carboxyl modified product of said hydrolyzed product obtained by reacting said hydrolyzed product with an unsaturated carboxylic acid or cyclic acid anhydride, both of said (1) and (2) containing sodium acetate as an impurity, with (B) 10 to 100 parts by weight of an organic solvent which is capable of dissolving said hydrolyzed product or said carboxyl modified product, said solvent being not freely miscible with water and having a boiling point of not lower than 80° C., (C) 300 to 1000 parts by weight of water, (D) 0.1 to 10 parts by weight of an alkylphenol ethylene oxide adduct having an HLB value of 10 to 20, and (E) an alkylbenzene sulfonic acid,
   emulsifying the resultant mixture while maintaining said mixture at a temperature of not lower than the softening point of said hydrolyzed product or said carboxyl modified product, and not higher than 95° C., and
   decreasing the temperature of the resultant system, under stirring, down to not higher than said softening point, to produce said powder which has a virtually spherical particle form and which has a particle size distribution such that not less than 70% of the particles are between 70 and 300$\mu$.

2. A method as claimed in claim 1, wherein the alkylphenol ethylene oxide adduct has an HLB value of 13 to 19.

3. A method as claimed in claim 1, wherein the organic solvent is an aromatic hydrocarbon having 6 to 14 carbon atoms.

4. A method as claimed in claim 1, wherein the unsaturated carboxylic acid is acrylic acid.

5. A method as claimed in claim 1, wherein the cyclic acid anhydride is maleic anhydride.

6. A method as claimed in claim 1, wherein the hydrolyzed product of an ethylene-vinyl acetate copolymer has a 5 to 95% degree of hydrolysis.

7. A method as claimed in claim 1, wherein the carboxyl modified product is obtained by reacting the hydrolyzed product with 0.1 to 15% by weight of the unsaturated carboxylic acid or the cyclic acid anhydride based on the weight of the hydrolized product.

8. A method as claimed in claim 1, wherein the amount of the organic solvent is 20 to 80 parts by weight.

9. A method as claimed in claim 1, wherein the amount of the alkylphenol ethylene oxide adduct is 0.2 to 2.0 parts by weight.

10. A method as claimed in claim 1, wherein the amount of the water is 400 to 800 parts by weight.

* * * * *